United States Patent Office 2,801,233
Patented July 30, 1957

2,801,233

ETHYLENE-VINYL CINNAMATE COPOLYMERS

Louis M. Minsk and Cornelius C. Unruh, Rochester, N. Y., assignors to Eastman Kodak Company, Rochester, N. Y., a corporation of New Jersey No Drawing. Application July 29, 1955, Serial No. 525,365

2 Claims. (Cl. 260—86.7)

This invention relates to light-sensitive ethylene-vinyl cinnamate copolymers of use in processes of the photomechanical art.

Inherently light-sensitive vinyl cinnamate polymers, the light sensitivity of which can be attributed to the presence in the polymer molecule of cinnamoyl groups have previously been described, for example, in the Minsk et al., U. S. Patents 2,610,120 granted November 7, 1950, and 2,690,966 granted October 5, 1954. In photomechanical processes, the light sensitivity of such polymers may be utilized to form resist images on supports for various purposes such as in the preparation of printing plates. A layer of the polymer on a support is simply exposed to ultraviolet light under a subject for a time sufficient to insolubilize the polymer in the exposed regions of the layer after which the unexposed portions of the polymer layer are dissolved away, leaving an insolubilized relief image on the support which may be used for various purposes.

We have discovered that desirable modifications in the physical properties of vinyl cinnamate polymers can be brought about by the incorporation of ethylene units into the polymer molecule. This is accomplished by esterifying ethylene-vinyl alcohol copolymers with cinnamic acid halides to obtain ethylene-vinyl cinnamate copolymers. In this manner polymers are obtained having superior flexibility and adhesion to various surfaces as well as high light-sensitivity. It will be noted that the polymers are not prepared by the polymerization of ethylene with vinyl cinnamates since this procedure can be expected to produce cross-linked polymers of poor solubility which have very limited use in photomechanical properties.

A surprising feature of the ethylene-vinyl cinnamate copolymers is that although they may contain as little as 50 mol percent of recurring vinyl cinnamate units, they are as light-sensitive as the fully esterified cinnamic acid esters of polyvinyl alcohol disclosed in the above patents. This is particularly true when the ethylene-vinyl cinnamate copolymers are sensitized with various compounds mentioned hereinafter.

The resinous ethylene-vinyl cinnamate copolymers of the invention contain from about 2 to 50 mol percent of combined recurring ethylene (—CH₂—CH₂) units, and from about 98 to 50 mol percent of the recurring vinyl cinnamate units having the structure

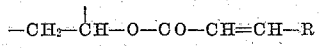

wherein R represents a univalent aromatic monocyclic radical of the benzene series such as phenyl, o-chlorophenyl, m-nitrophenyl and p-methoxyphenyl. However, there may be present in the polymer molecules a small amount of residual vinyl ester of the order of one mol percent resulting from the incomplete hydrolysis of the ethylene-vinyl ester copolymers used in preparing the polymers of the invention. Ethylene-vinyl cinnamate copolymers containing more than about 50 mol percent of ethylene can be prepared but these copolymers have reduced light sensitivity even in the presence of certain sensitizing agents mentioned hereinafter and the physical properties are not appreciably better than those containing 2 to 50 mol percent of ethylene.

The polymers of the invention may be prepared as follows:

EXAMPLE 1

*Preparation of vinyl acetate-ethylene copolymer*

The following solution was placed in a suitable pressure vessel equipped with a stirrer and heating jacket:

| | Grams |
|---|---|
| Vinyl acetate | 100 |
| Boiled and cooled distilled water | 200 |
| Ammonium persulfate | 0.90 |
| Potassium dihydrogen phosphate | 0.75 |
| Sodium lauryl sulfate | 0.68 |

The pH of the solution was adjusted to 6.4 by the addition of sodium hydroxide solution. The supernatant atmosphere in the closed vessel was displaced by ethylene and then pressured with ethylene to 98 lbs./sq. in. at 60° C. The contents of the vessel were heated and stirred while the reaction temperature was maintained at 60° C. The pressure was maintained at 90 lbs./sq. in. during the interval of reaction. After a total of 4½ hours of heating and stirring, the vessel was cooled and the product was coagulated to give a white rubbery polymer which was washed well with water and dissolved in methanol. This solution was poured in a thin stream into agitated cold water to give a white, slightly tacky fibrous precipitate, which was dried at 40° C. It had a carbon content of 56.9, indicating that the polymer had an ethylene content of 3.5 percent (10 mol percent).

*Preparation of vinyl alcohol-ethylene copolymer*

To 250 g. of a 30 percent solution of this copolymer in methanol was added 25 ml. of a 10 percent methanolic solution of sodium hydroxide while stirring rapidly. In about 5 minutes, the viscous solution set to a rigid gel, which was then cut up in small pieces and leached overnight in 2 percent methanolic sodium hydroxide solution. After washing the gel in running cold water for several hours, it was then leached in a 2 percent aqueous solution of sodium hydroxide and again thoroughly washed in running cold water. The gel was now dissolved in hot water containing a little alcohol and the solution filtered. The filtrate was poured into methanol, the white fibrous product leached in fresh methanol, then dried at 40° C. The polymer contained residual acetyl to the extent of one percent.

*Cinnamoylation of vinyl alcohol-ethylene copolymer*

Ten grams of the vinyl alcohol-ethylene copolymer were heated overnight on a steam bath in 100 cc. of dry pyridine in an all-glass reflux outfit protected from atmospheric moisture by a calcium chloride tube. The reaction mixture was then diluted by 100 cc. of dry pyridine and 40 g. of cinnamoyl chloride were added with shaking. Doping began almost immediately. The reaction mixture was maintained at 50° C. for 4½ hours. The dope was diluted with 2 volumes of acetone and poured into 6 liters of distilled water, vigorously stirred. After stirring for 10 minutes, the precipitate was filtered onto a Buchner funnel and then stirred with three 3-liter portions of distilled water for 30 minutes, filtering after each. The product was dried in a vacuum desiccator over calcium chloride under a constantly applied water pump vacuum. The yield was 30 g.

The polymer thus obtained had an ethylene content of about 10 mol percent, the balance of the recurring units of the polymer molecule being vinyl cinnamate units.

This polymer was found to be light-sensitive and capable of being sensitized to increase its light sensitivity.

EXAMPLE 2

Twenty-two grams of a hydrolyzed interpolymer of vinyl alcohol and ethylene (containing 33 mol percent of ethylene) were heated and stirred on the steam bath with 100 ml. of anhydrous pyridine. The solution was diluted with another 100 ml. of dry pyridine and while stirring, 100 g. of cinnamoyl chloride were slowly added, the outside of the flask being cooled by running water. Heat was evolved during the addition, the temperature rising to 70° C. After addition was complete, the temperature was adjusted to 50° C. and maintained at this temperature for 4½ hours. The resulting solution was diluted with 250 ml. of acetone and filtered. To the filtrate was added a further 400 ml. of acetone and this solution was poured slowly into 8 liters of agitated cold water. The soft, rubbery polymer was extracted repeatedly with water until free from the odor of pyridine. The precipitate was now squeezed out and dissolved in 700 ml. of 1,4-dioxane. The solution was again poured into a large volume of agitated water and thoroughly washed. After drying at 40° C. the polymer weighed 63 g. and contained 70 percent cinnamoyl, calculated to contain (by difference) 31.8 mol percent of ethylene.

When sensitized with 10% of its weight of 2-benzoylmethylene-1-methyl-$\beta$-naphthothiazoline, this polymer had a sensitometric speed of 320.

On the same sensitometric speed scale, polyvinyl cinnamate has approximately the same light sensitivity when sensitized in the same manner with the thiazoline compound.

A comparison was made between a coating of this polymer from a 10 percent chlorobenzene solution on a flexible aluminum support and a similar coating of polyvinyl cinnamate on the same support by wrapping each sample around a mandrel of small diameter. The coating prepared from the ethylene vinyl cinnamate copolymer showed less tendency to fracture than did the polyvinyl cinnamate coating.

In order to demonstrate the unique properties of the ethylenevinyl cinnamate copolymers, the procedure of Example 2 was repeated, substituting crotonic anhydride for cinnamoyl chloride in the synthesis to obtain an ethylene-vinyl crotonate copolymer substantially insensitive to light as follows:

EXAMPLE 3

Five grams of the hydrolyzed copolymer of vinyl acetate and ethylene (containing 33 mol percent of ethylene) were dissolved in 25 ml. of hot anhydrous pyridine. To the solution was added 20 g. of crotonic anhydride and this was heated on a steam bath under anhydrous conditions for 2 hours. The solution obtained was poured slowly into a large volume of agitated warm water. The soft, sticky polymer was thoroughly washed and then dissolved in methanol containing a small amount of dioxane. This solution was poured into a large volume of cold water and the soft, sticky polymer was dried at 40° C.

Coatings made from this polymer were quite tacky to the touch. When sensitized with 10% of its weight of 2 - benzoylmethylene - 1-methyl-$\beta$-naphthothiazoline, the polymer showed a sensitometric speed of only 3.2 under the same conditions of testing used for the polymer of Example 2.

EXAMPLE 4

An ethylene-vinyl cinnamate copolymer containing approximately 50 mol percent of ethylene can be prepared as follows:

Ten grams of a copolymer of ethylene and vinyl alcohol (containing approximately 50 mole percent of ethylene) was dissolved in 70 ml. of warm pyridine. To the stirred solution was added cautiously 26 g. of cinnamoyl chloride. The brown solution was diluted with dioxane and poured in a thin stream into a large volume of agitated cold water. The fibrous precipitate was thoroughly washed with water and dried.

This polymer showed good sensitivity to light particularly when sensitized with 2-benzoylmethylene-1-methyl-1-$\beta$-naphthothiazoline.

EXAMPLE 5

Ten grams of a hydrolyzed copolymer of vinyl acetate and ethylene, containing 2.1 mole percent of ethylene, was heated on a steam bath with 75 ml. of dry pyridine under anhydrous conditions for two hours and then cooled. To this solution was added cautiously 42 g. of cinnamoyl chloride while stirring and cooling the mixture. This was heated at 50° C. and stirred for 4 hours, and the brown solution was thinned with acetone and poured into a large volume of agitated water. The light tan fibrous polymer was thoroughly washed with water and dried. Analyses indicated that the cinnamoylation of the hydroxyl groups in the polymer was essentially complete.

The product was examined for its sensitivity to light in the following manner.

Ten grams of the polymer was dissolved in 500 ml. of methyl Cellosolve acetate and to the solution was added 0.5 gram of 2-benzoylmethylene-1-methyl-$\beta$-naphthothiazoline. This solution was whirled on a grained zinc metal plate (at 78 R. P. M.) and the coating dried. This coating was then exposed through a half-tone negative to a 35 ampere arc at 4 feet for one minute. The exposed coating was developed in methyl Cellosolve acetate for two minutes, rinsed briefly with fresh methyl Cellosolve acetate and dried.

The plate was run on a printing press in the conventional manner and high quality prints obtained therefrom.

EXAMPLE 6

Ten grams of a hydrolyzed copolymer of ethylene and vinyl acetate (containing 7.0 mole percent of ethylene) was heated with 100 ml. of dry pyridine on a steam bath under anhydrous conditions for 4 hours. The mixture was cooled and to it was added 60 grams of m-nitrocinnamoyl chloride. The rising temperature was controlled by cooling and another 100 ml. of dry pyridine was added. This mixture was heated and stirred at 50° C. for three hours. The smooth brown solution was poured into a large volume of agitated methanol. The tan fibrous polymer was thoroughly washed with methanol then dried.

A coating of this polymer from a 2% solution in hot dioxane was exposed through a half-tone negative and developed for two minutes in that solvent. A positive image was obtained which could be inked with a lithographic ink and the image transferred to paper.

When the above coating was repeated, adding 5% of 2 - benzoylmethylene - 1-methyl-$\beta$-naphthothiazoline, the exposure required to give a suitable image was considerably less.

EXAMPLE 7

Four grams of a hydrolyzed copolymer of ethylene and vinyl alcohol (containing 33 mole percent of ethylene) was mixed with 40 ml. of dry pyridine and heated on the steam bath until solution occurred. To the hot solution was added cautiously, with stirring, 25 g. of p-methoxycinnamoyl chloride. The solution was heated at 60° C. for two hours and the brown solution on cooling was diluted with acetone. The solution was poured into a thin stream into a large volume of agitated water. The fibrous precipitate was thoroughly washed with water and dried at 50° C.

A 2% solution of this polymer in methyl ethyl ketone and containing 5% (based on the weight of the polymer) of Michler's ketone was coated on Duplimat paper. The coating was exposed to a source of ultra-violet light through a half-tone negative. The exposed coating was developed in methyl ethyl ketone for two minutes and the resulting image was inked with lithographic ink. The positive image corresponded to the negative image through which the exposure was made.

The polymers of the invention can be sensitized to increase their light sensitivity in the manner described in the above examples using, for example, the sensitizing agents disclosed in U. S. Patents 2,610,120, 2,670,285, 2,670,287, 2,690,966 and particularly the thiazoline sensitizing agents disclosed in the Robertson U. S. patent application Serial No. 314,806, filed October 15, 1952, now U. S. Patent No. 2,732,301.

As briefly mentioned above, the ethylene-vinyl cinnamate copolymers of the invention may be used for photomechanical purposes by merely coating a layer of the polymer on a suitable support such as a hydrophilic lithographic paper printing plate support, aluminum, zinc, copper, magnesium plates, etc., exposing the layer under an image to imagewise insolubilize the coating, then washing away the unexposed polymer leaving an insolubilized polymeric relief image on the support which may be used directly for printing purposes or may serve as an etching resist in the prepaartion of etched metal printing plates.

In a parallel investigation, polyethylene polymers (free of vinyl cinnamate) were found to possess useful light sensitivity in the above-mentioned photomechanical processes; however, the polymers did not respond to sensitization with the above sensitizing agents such as the thiazoline compound of Example 2.

A mode for using polyethylenes in photomechanical processes is to dissolve the polymer in 2% concentration in hot trichlorethylene, coat on a counter-etched grained zinc lithographic plate, exposed to an ultraviolet source under a subject and develop with the same solvent. The resulting plates can be printed on a lithographic printing press. While as mentioned the polyethylenes do not respond well to sensitization with the mentioned sensitizing agents it was found that the chalcones such as dicinnamal acetone exert a pronounced sensitizing effect upon these polymers. Ten percent by weight of the polymer of the chalcone is satisfactory for this purpose and the polyethylenes thus sensitized can be coated from and processed with trichloroethylene as described. Since the polyethylenes do not contain any chromophoric groups as compared to light-sensitive polymers such as the vinyl cinnamate polymers, it is probable that the mechanism of insolubilization with ultraviolet light is separate and distinct from that of the vinyl cinnamate polymers and may be attributed to the generation of free radicals at some sites of the polymer chain which react with similar centers on other polymer molecules.

What we claim is:

1. A resinous copolymer containing from about 2 to 50 mol percent of recurring ethylene units and from about 98 to 50 mol percent of recurring units having the general formula

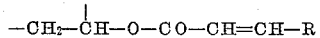

wherein R represents a univalent aromatic monocyclic radical of the benzene series.

2. A resinous copolymer of ethylene and vinyl cinnamate containing from about 2 to 50 mol percent of recurring ethylene units and from about 98 to 50 mol percent of recurring vinyl cinnamate units.

References Cited in the file of this patent

UNITED STATES PATENTS

| | | |
|---|---|---|
| 2,200,429 | Perrin et al. | May 14, 1940 |
| 2,403,464 | Smith | July 9, 1946 |
| 2,467,774 | Plambeck | Apr. 19, 1949 |
| 2,670,286 | Minsk | Feb. 23, 1954 |